United States Patent

Wills

[15] 3,686,891
[45] Aug. 29, 1972

[54] ELECTRONIC SAFETY CONTROL SYSTEM FOR VEHICLE COMPRESSORS

[72] Inventor: Frank Eugene Wills, York, Pa.

[73] Assignee: Borg-Warner Corporation, Chicago, Ill.

[22] Filed: Sept. 21, 1970

[21] Appl. No.: 73,818

[52] U.S. Cl. ..........................62/158, 62/228, 62/244, 62/323, 123/41.11
[51] Int. Cl. ............................................F25b 27/00
[58] Field of Search........62/228, 230, 244, 323, 158; 123/41.11

[56] References Cited

UNITED STATES PATENTS

| | | |
|---|---|---|
| 3,121,314 | 2/1964 | Kayanagi..................62/228 |
| 3,186,184 | 6/1965 | Proitt.........................62/323 |
| 3,429,192 | 2/1969 | Allen..........................62/323 |

*Primary Examiner*—Meyer Perlin
*Attorney*—Donald W. Banner, William S. McCurry and John W. Butcher

[57] ABSTRACT

A control system for decoupling the mechanical drive between a vehicle mounted air conditioning compressor and the vehicle's engine in response to sensed engine speeds beyond a high level.

9 Claims, 2 Drawing Figures

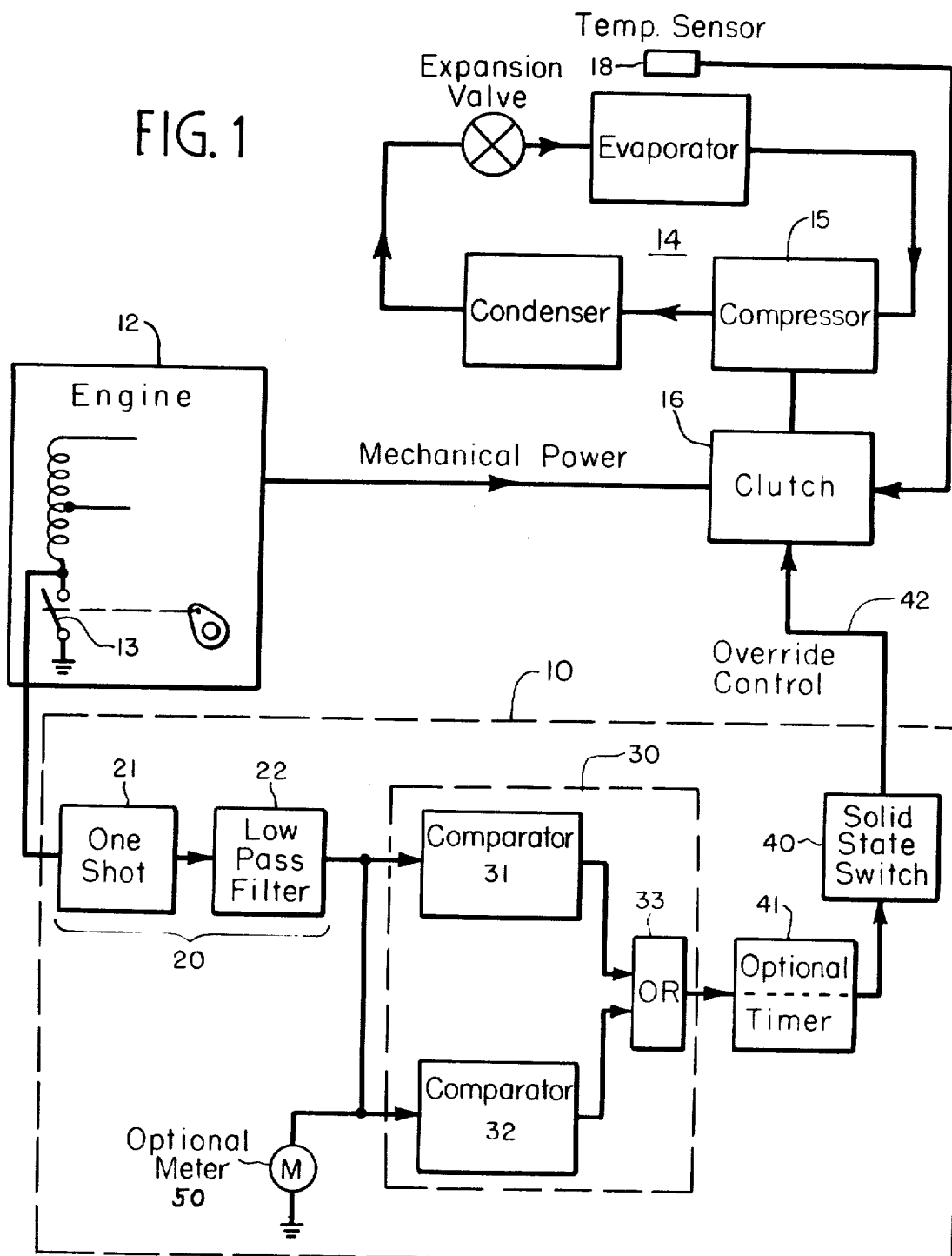

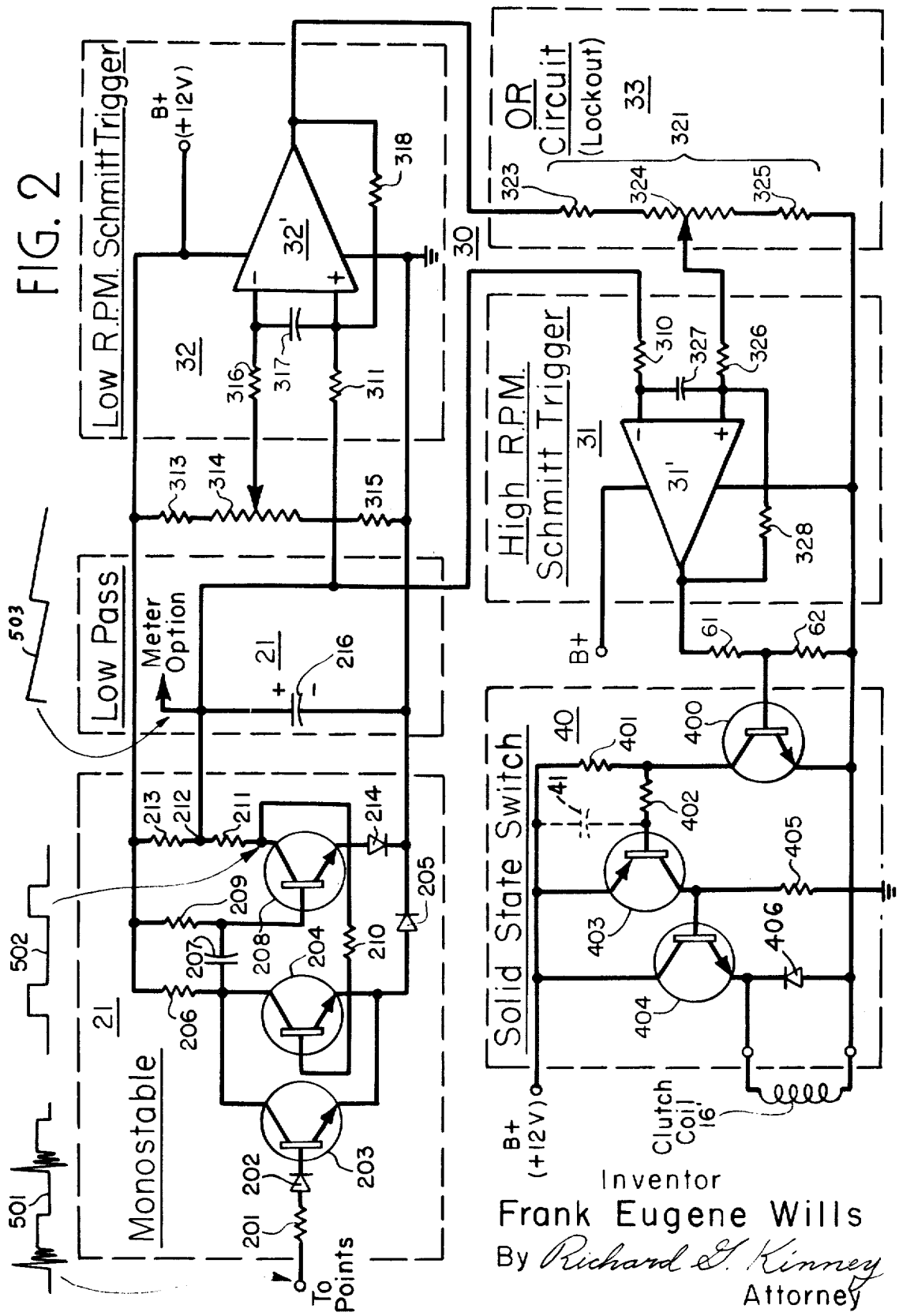

ELECTRONIC SAFETY CONTROL SYSTEM FOR VEHICLE COMPRESSORS

BACKGROUND OF THE INVENTION

It is common today to equip vehicles, especially the common passenger automobile, with refrigeration equipment especially for use in air conditioning the passenger compartment. This refrigeration equipment normally is of the closed cycle vapor-evaporator type and is driven by a compressor. Most commonly the compressor is mounted in the engine compartment coupled by a pulley-belt system to the engine output. In this arrangement control of cooling is achieved by means of an electric operated clutch between the compressor pulley and its operating shaft.

The compressor is normally designed for a particular range of tolerable operating speeds. As its speed is directly related to engine speed it can happen under some conditions that the compressor is driven beyond its range of tolerable rotational speeds. This extreme speed can lead to the damage or even the destruction of the compressor and this compressor destruction in the engine environment could cause additional damage.

SUMMARY OF THE INVENTION

To prevent damage or destruction of such compressors or the like by overdriving the present invention provides an electronic control system which includes means for developing an electrical signal representative of engine rotational speed, a comparator circuit, such as a Schmitt Trigger circuit, for comparing that signal with a reference voltage signal and for producing an output signal when the speed signal reaches a predetermined relation with the reference signal and means responsive to the output of the comparator to disengage the compressor drive from the engine.

The speed signal is, in accordance with a subsidiary feature of the invention, derived in the case of vehicles equipped with gasoline internal combustion engines by using a monostable multivibrator (also called a "one-shot") driven by the voltage changes across the "-points" switch. The monostable drives an integrating capacitance-resistance circuit.

As it is also desirable to remove the compressor's load from the engine when the engine is operating at relatively low speeds (as in starting or when approaching stalling) it is a further feature of the present invention to employ a second comparator coupled to the speed voltage signal with a second reference voltage, so that the drive disengaging means will be operated whenever either excessively high or low engine speeds are encountered.

Additional but subsidiary features and advantages of the invention include the addition of a time delay circuitry to prevent rapid cycling of the control, the addition of a voltage meter across the speed voltage output to serve as a tachometer, and the use of one speed responsive comparator circuit to provide the voltage to a reference voltage divider circuit for the other comparator to achieve a logical "or" function thereby.

The invention, together with the further advantages thereof, may best be understood by reference to the following description taken in connection with the accompanying drawings, in the several figures of which like reference numerals identify like elements.

BRIEF DESCRIPTION OF THE DRAWINGS

FIG. 1 is a block diagram of an electronic safety control system for refrigeration compressors of motor vehicles, constructed in accordance with the present invention shown in a particular environment of use; and FIG. 2 is a circuit diagram of the inventive system of FIG. 1.

DETAILED DESCRIPTION

Referring to FIG. 1, there is depicted an electric safety control system for motor vehicle refrigeration compressors, which is generally designated by the numeral 10 and is constructed in accordance with the present invention.

Also depicted in general form in that figure are a conventional motor vehicle engine 12 which is, for specificity, of the conventional gasoline internal combustion type although the present invention may be employed with other types of engines. The engine 12 supplies mechanical power to a refrigeration system 14. As is conventional the system 14 includes a compressor 15 as the driven unit. Power is coupled by means of an electric clutch 16 which, as is conventional, is normally controlled by a temperature sensor 18 when the refrigeration system 14 is in use. The clutch 16, is mounted between the compressor 15 and the mechanical power take off, normally a pulley-belt arrangement. Although described herein in this particular and presently common environment, the invention can be applied in other types of refrigeration equipment and engines.

The inventive system 10 includes means 20 for producing an electric signal representative of engine speed. These means 20 include a monostable multivibrator 21 which takes its input from a pulsating electrical signal of the engine 12, for example, the signal across the engines "points" switch 13. This switch 13 is opened and closed by a cam which is geared to the drive shaft of the engine 12. It thus produces a pulsating output whose rate is a function of engine speed. Of course, other pulsating electrical signals of the engine 12 that are related to engine speed may be employed without departing from at least the broader aspects of the present invention. The multivibrator 21, which is also known as a "one-shot", produces an output pulse of predetermined waveform and duration in response to each closure of the switch 13. These output pulses are integrated and time averaged in a low pass filter 22. The output of the filter 22 is a d.c. voltage whose level is proportional to engine speed. This output is fed to a monitoring unit 30 which includes a pair of comparator circuits 31, 32 which respectively produce an output whenever the speed voltage signal exceeds a predetermined high lever or falls below a predetermined low level. These comparator outputs are logically "or-ed" as indicated by the "or" unit 33, to produce common output which may be applied to a solid state switch 40, either directly or after a safety integrating circuit time delay 41 to prevent too rapid cycling and suppress transients. The solid state switch 40 functions, as indicated by the line 42, to override the control of the temperature sensor 18 and to disengage the clutch 16 if it is engaged or to prevent engagement of the clutch 16 while the output of the monitor unit 30 is at its operational level.

In summary the "points" switch 13 feeds pulses to the one-shot 21. The output of the one-shot 21 is a pulse of constant width and amplitudes at a rate equal to the breaking rate of the "points" switch 13. These pulses are applied to the low pass filter 22 which integrates them, producing a d.c. voltage which is directly proportional to engine speed.

This proportional d.c. voltage is compared to the reference voltage in the comparator or voltage level detectors (Schmitt Trigger Circuits) 31, 32. The voltage level detectors 31, 32 differ from each other in that one comparator 31 switches to a positive output when the proportional d.c. voltage from the low pass filter 22 is above the reference voltage, and the other comparator 32 switches when it is below the reference voltage.

The outputs of the voltage level detectors 31, 32 are then combined in the "or" circuit 33 which produces an output when either level detector 31, or 32 indicates that the reference voltage has been exceeded. The output of the "or" circuit 33 is connected through the optional timer 41 to the solid state switch 40 which controls the clutch 16 on the automotive compressor 15.

If the engine is turning between a low and high speed, e.g. 600 and 4,500 RPM, the clutch on the automotive compressor may be energized. Should engine speed exceed the high level, 4,500 RPM in this example, at the high end or drop below the low level, 600 RPM in this example, on the low end, the clutch is deenergized and prevented from being energized until the engine returns to this speed range.

An optional tachometer can be formed by adding a d.c. meter 50 with a scale reading, for example, in RPM and which is fed from the speed voltage source 20.

Referring now to FIG. 2 the system 10 is there depicted in greater detail. It can there be seen that the monostable 21 includes a resistor 201 which is connected to the points switch and to the anode of a diode 202 whose cathode is connected to the base of an NPN transistor 203. The emitter of the transistor 203 is connected in common with the emitter of a second NPN transistor 204 and to the anode of a diode 205 whose cathode is grounded. The collectors of the transistors 203 and 204 are also connected together, through a resistor 206 to a source of positive bias B+ and through a capacitor 207 to the base of a third NPN transistor 208.

The base of the transistor 208 is also connected through a resistor 209 to B+. The base of the transistor 204 is connected through resistor 210 to the collector of the transistor 208, which collector is connected through a resistor 211 to a junction point 212. The junction point 212 is connected through another resistor 213 to B+, to a meter take-off and also to the low pass filter 21. The emitter of the transistor 208 is connected through anode-cathode circuit of a diode 214 to ground. The low pass filter 21 consists of a capacitor 216 connected between the terminal point 212 and ground. The voltage across this capacitor 216 may be used for the meter option and is also connected to the inputs of the monitor unit 30.

The monitor unit 30 consists of comparators 31 and 32 which are respectively made up of operational amplifiers 31' and 32' which are preferably formed on a single substrate so as to be matched in their performance. The speed representative voltage is fed to the negative input terminal of the operational amplifier 31' through a resistor 310. The speed representative voltage is connected through another resistor 311 to the positive input of the operational amplifier 32'. Reference voltage for the negative input of the operational amplifier 32' is obtained through a voltage dividing circuit comprising a fixed resistor 313 connected in series between B+ and a potentiometer 314 whose other side is connected through a fixed resistor 315 to ground. The adjustable tap point of the potentiometer 314 connects the reference voltage, through a fixed resistor 316, to the negative input of the operational amplifier 32'. Connected between the input terminals of the operational amplifier 32' is a capacitor 317. The output of the operational amplifier 32' is fed back to its positive input terminal through resistor 318 and is also fed to a voltage dividing circuit 321 which includes a fixed resistor 323, a potentiometer 324 and a fixed resistor 325 connected in series. The resistor 325 has one end grounded. This voltage dividing circuit 321 serves as the reference voltage input, via the tap of the potentiometer 324 and a resistor 326, to the positive input terminal of the operational amplifier 31'.

As the voltage dividing circuit 321 is fed from the output of the operational amplifier 32 this arrangement serves as the "or" function of the "or" circuit 33.

As was the case with the previous operational amplifier, a capacitor 327 is connected between the positive and negative input terminals of the operational amplifier 31 and a feedback resistor 328 is connected between its positive terminal and its output.

The output of the comparator 31 is fed through a voltage dividing network comprising the series connected resistors 61 and 62 which are connected in series to ground. From the junction of series connected resistors 61 and 62 the alarm signal is fed to a NPN transistor 400 which forms part of the solid state switch 40. The emitter of the NPN transistor 400 is connected to ground and its collector is connected through a bias establishing resistor 401 to B+ and through a current limiting resistor 402 to the base of PNP transistor 403 whose emitter is connected to B+ and whose collector is connected to the base of a NPN power transistor 404 and also through a bias establishing resistor 405 to ground. The collector of the transistor 404 is connected to B+ and its emitter is connected to the cathode-anode circuit of a safety diode 406 to ground. The output of the solid state switch 40 is taken from across the diode 406 to control the clutch coil 16'.

In operation, voltage pulses of the waveform 501, depicted adjacent to the input of the monostable 21, are impressed on that input from across the "points" switch. These positive pulses function to latchably turn on or render conductive the transistor 203 and result in the rendering of the transistor 208 conductive for a predetermined pulse. The response thereto at the collector of the transistor 208 is indicated by the current waveform 502. The result at the terminal 212 is a voltage waveform such as that depicted at 503 which is essentially a d.c. level proportional to the speed of the engine. When this waveform reaches or falls below the voltage at the tap on resistor 314 the comparator circuit 32 output changes from a high to a low level. This lowers the reference voltage on the comparator 31 and changes its output to a low value. This low voltage in turn biases off the transistor 400 which in turn biases off the transistor 403 and the power transistor 404, which will de-energize the clutch.

When the voltage level at terminal point 212 is high, higher than the minimum voltage selected by the tap of the resistor 314, the operational amplifier 32 produces high output which maintains the voltage across the voltage dividing circuit 321 at a high level.

When the voltage at tap 212 exceeds the reference voltage communicated to the positive input of the operational amplifier 31, the operational amplifier again turns its output voltage to a low value turning off the transistor 400 which results in the turning off of the transistors 403 and 404 and releasing the clutch.

As should now be apparent from the above, a new and improved electronic safety system for motor vehicle refrigeration compressor couplings for disengaging or preventing engagement of the engine drive from the compressor in response to sensed engine speed has been described. The above described system prevents the compressor from being driven at excessive speeds beyond the predetermined value and also for unloading of the engine at excessively low speeds.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. In a motor vehicle having an engine and an accessory which accessory is selectively drive coupled to the engine and which engine develops a pulsating electrical signal proportionate to engine speed the improvement of having an electronic safety control system for governing the engagement of the engine drive to the accessory, comprising:
   first means coupled to the engine for developing an electrical signal representative of engine speed including:
      a monostable multivibrator coupled for operation to the source of pulsating electrical signals of the engine, and
      a resistive-capacitive circuit connected to time integrated and average the output of said monostable multivibrator; and
   second means operatively coupled to said first means for governing the engagement of the engine drive to the accessory in response to the output of said resistive-capacitive circuit when the speed signal reaches a predetermined level.

2. In a motor vehicle having an engine driven refrigeration system, the improvement comprising:
   first means for developing electrical signals representative of engine rotational speed;
   a source of a reference electrical signals;
   a comparator circuit coupled to receive the engine speed signals of said means and the reference signals of said source, to compare said signals and to produce output signals when the engine speed signals reach a predetermined relation with the reference signals said predetermined relationship being representative of a high engine rotational speed;
   second means responsive to the output of the comparator circuit to govern the drive of the refrigeration system by the engine,
   whereby damage or destruction of the refrigeration system from overdriving by the engine is prevented.

3. The improvement as defined in claim 2 for a motor vehicle of the type there set out, wherein:
   a source of a second reference electrical signals is provided;
   a second comparator circuit operatively coupled to said first means is provided for producing output signals when the speed signal reaches a predetermined low engine speed representative level, which second comparator circuit is also coupled in a logical "OR" relationship to said second means to have its output signal to cause said second means to disengage and prevent engagement of the engine and the refrigeration system;
   whereby the refrigeration system is not driven when the engine speed is above a first predetermined sensed high speed nor below a selected low speed.

4. An electronic control system for motor vehicles having an engine for driving the vehicle and a refrigeration system also driven from that engine comprising, in combination:
   means for producing a voltage signal representative of the speed of the engine;
   a monitor coupled to said first means for monitoring the speed signal of said first means and producing an alarm signal when said speed signal reaches a predetermined state, said monitor including means for producing the alarm signal when the speed signal reaches either of two states representing a high engine speed or low engine speed and not for speed signals representing speeds therebetween;
   said speed signal producing means including a short on-time monostable multivibrator coupled for triggering by an electrical signal from the engine, and a low pass filter circuit coupled to said multivibrator for integrating and time averaging the output of said multivibrator to produce a d.c. voltage level which level is proportional to engine speed;
   a second means coupled to said monitor, for preventing the coupling and for decoupling the refrigeration system from the engine in response to the alarm signal of said monitor;
   whereby driving of the refrigeration system by the vehicle engine is prevented at engine speeds wherein such driving would be undesirable.

5. The combination as set out in claim 4 wherein:
   said monitor includes a first comparator (31) and a second comparator (32) said first comparator so connected as to produce an output signal whenever the voltage level of said speed signal reaches preselected low level, and said second comparator so connected as to produce an output when the voltage level of said speed signal reaches a preselected high level.

6. The combination as set out in claim 5, wherein:
   said output of said first comparator serves to determine the reference voltage input of said second comparator and the output of said second comparator is the alarm signal.

7. The combination as set out in claim 6, wherein:
   a time delay circuit (41) for coupling to said second means for delaying the operation of said second means is employed.

8. The combination as set out in claim 6, wherein:

said first and second comparators are matched operational amplifiers with the primary positive input of each of said operational amplifiers connected to receive the speed signal and the primary negative input of said first operational amplifier connected to a predetermined d.c. level voltage and the output of said first operational amplifier connected across a voltage dividing circuit whose output serves as the primary positive input of said second operational amplifier.

9. The combination as set out in claim 4 wherein a tachometer is provided which comprises a voltmeter which is connected to measure the d.c. voltage level speed signal and has its scale graded in engine speed units.

* * * * *